(12) United States Patent
Huonker et al.

(10) Patent No.: US 6,447,125 B1
(45) Date of Patent: Sep. 10, 2002

(54) DEVICE FOR INFLUENCING A LASER BEAM

(75) Inventors: Martin Huonker, Stuttgart; Adolf Giesen, Renningen; Martin Bea, Stuttgart; Helmut Hügel, Sindelfingen, all of (DE)

(73) Assignee: Trumpf GmbH & Co. (DE)

( * ) Notice: Subject to any disclaimer, the term of this patent is extended or adjusted under 35 U.S.C. 154(b) by 0 days.

(21) Appl. No.: 09/097,912

(22) Filed: Jun. 16, 1998

(30) Foreign Application Priority Data

Jun. 16, 1997 (DE) .......................... 197 25 353

(51) Int. Cl.[7] .......................... G02B 5/08; G02B 7/182; B23K 26/02; B23K 26/08
(52) U.S. Cl. .................. 359/846; 359/848; 359/849; 219/121.62; 219/121.67; 219/121.74; 219/121.78; 219/121.81
(58) Field of Search ................. 359/224, 845, 359/846, 847, 848, 849, 872; 219/121.61, 121.62, 121.67, 121.74, 121.78, 121.81

(56) References Cited

U.S. PATENT DOCUMENTS

| | | | | |
|---|---|---|---|---|
| 2,760,407 A | * | 8/1956 | Bauersfeld | 359/846 |
| 4,091,274 A | * | 5/1978 | Angelbeck et al. | 359/849 |
| 4,154,530 A | * | 5/1979 | Connolly, Jr. et al. | |
| 4,657,358 A | * | 4/1987 | Anthony et al. | |
| 4,831,291 A | * | 5/1989 | Ames | 359/849 |
| 4,934,803 A | * | 6/1990 | Ealey | |
| 5,016,998 A | * | 5/1991 | Butler et al. | 359/846 |
| 5,037,190 A | * | 8/1991 | Ealey et al. | 359/849 |
| 5,074,654 A | * | 12/1991 | Alden et al. | 359/846 |
| 5,166,504 A | * | 11/1992 | Protz et al. | |
| 5,204,784 A | * | 4/1993 | Spinhirne | 359/846 |
| 5,357,825 A | * | 10/1994 | Costello et al. | 359/849 |
| 5,571,430 A | * | 11/1996 | Kawasaki et al. | 219/121.78 |
| 5,777,807 A | * | 7/1998 | Bar et al. | 359/846 |
| 5,798,878 A | * | 8/1998 | Asari et al. | 359/847 |

FOREIGN PATENT DOCUMENTS

DE 004138557 * 5/1993 ................. 359/846

* cited by examiner

Primary Examiner—Ricky D. Shafer

(57) ABSTRACT

The invention relates to a device for influencing a laser beam by means of an adaptive mirror (12) in the beam path, having a piezoelectric adjusting member (17) arranged on the back of the mirror (12), it being the case that, in order to achieve low-aberration deformation of the mirror (12) for the purpose of influencing the divergence of the beam, there is provided between the adjusting member (17) and the back (24) of the mirror (12) a pressure-transmitting device (19) which acts on a large area of the deformable surface of the mirror (12).

25 Claims, 3 Drawing Sheets

DEVICE FOR INFLUENCING A LASER BEAM

Figure 1:
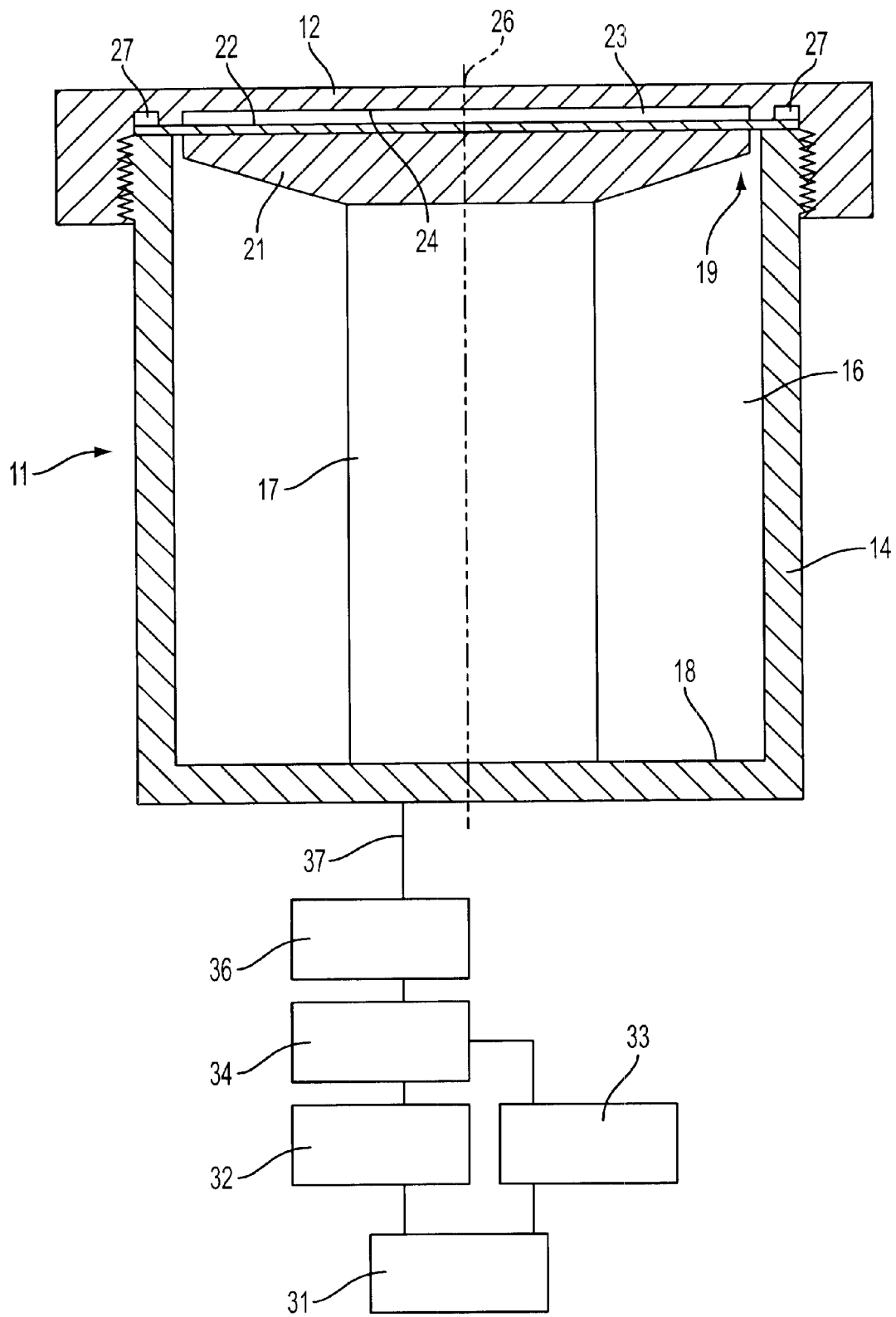

The invention relates to a device for influencing a laser beam by means of an adaptive mirror in the beam path.

Such a device is disclosed, for example, in DE 41 08 419 A1 for influencing the wave front and the cross-sectional geometry of the laser beam on the workpiece to be machined. Arranged for this purpose as near as possible to the laser beam source is a deflecting mirror with a mirror surface which ensures in conjunction with a minimum stroke of an actuator that the mirror is caused to bulge and produce a large beam expansion, in order thus to keep the focus spot diameter constant and/or to be able to adapt the machining parameters flexibly to the machining task. The actuator is constructed as a piezoelectric final controlling element which is arranged in a mirror housing. The piezoelectric final controlling element acts directly on the back of the mirror, it being possible as a result to achieve a rapid and exact alignment of the mirror.

However, such devices have the disadvantage that it is particularly difficult to achieve a pinpointed change or adjustment of the curvature of the mirror surface, as a result of which the optical quality of such systems is limited. This is based on the fact that the force for the curvature of the mirror is introduced at only one point on the back. It is therefore difficult to achieve a uniform flexure or surface curvature of the mirror, as a result of which the aberration of the mirror is increased. Moreover, such devices have the disadvantage that it is not possible for the mirror curvature to be adjusted in a damped or soft fashion. When the piezoelectric final controlling element is being driven, the change in length occurs suddenly, that is to say the force is likewise introduced suddenly onto the back of the mirror, as a result of which the quality of the optical system is limited.

A further principle of influencing a laser beam by means of an adaptive mirror is disclosed in DE 41 37 832 A1. In the case of this device or the adaptive mirror, the surface curvature is changed by employing the principle of a round plate to which a hydrostatic pressure is applied. Said pressure is applied in the centre of the mirror by a cooling liquid. The cooling liquid is removed via coolant discharge lines arranged at the edge of the mirror. The pressure of the cooling liquid is preferably controlled via electromagnetic valves.

Such systems have the disadvantage, however, that they have only a limited bandwidth for the rate of adjustment, which is limited to 50 Hz, for example. Such a system is excessively slow in reacting for a multiplicity of applications.

It is therefore the object of the invention to create a device for influencing a laser beam by means of an adaptive mirror in the beam path, in which a high optical quality is provided in conjunction with a high dynamic bandwidth of the rates of adjustment.

This object is achieved according to the invention by means of the characterizing features of Claim 1.

Because of the inventive combination of the two principles, that is to say the hydraulic deformation of the mirror and the piezoelectric deformation of the mirror, it is possible to create an optical system of high quality and, at the same time, a system having a high dynamic bandwidth of the frequency which can be modulated. Because of the deformation of the mirror by the hydrostatic pressure by means of a pressure-transmitting device, it is possible to achieve uniform introduction of force, and thus to achieve harmonic flexure of the mirror. Since the deformation pressure is applied via the pressure-transmitting device by means of piezoelectric final controlling element, there can be a high dynamic bandwidth for changing the mirror curvature, since the pressure-transmitting device acts indirectly or directly on the back of the mirror.

According to an advantageous embodiment of the invention, it is provided that the pressure-transmitting device has a largely incompressible, easily deformable intermediate body. This has the advantage that the exact and rapid change of the adjusting path of the piezoelectric final controlling element does not act directly on the back of the mirror, but directly or indirectly on the intermediate body, with the result that it is possible to preserve the soft hydraulic deformation and, above all, uniform introduction of forces for flexure.

According to a further advantageous embodiment of the invention, it is provided that the pressure-transmitting device has a pressure-transmitting member which acts on the intermediate body. Said pressure-transmitting member advantageously extends over the diameter or virtually over the diameter of the intermediate body. By contrast with the direct drive, via a piezoelectric final controlling element, it is possible as a result for the amplitude of the flexurized midpoint to be substantially higher than in the case of a direct drive, via the piezoelectric final controlling element. The reason for this is, in particular, that the volume of the intermediate body is substantially displaced by the pressure-transmitting member, preferably in the edge region. It is possible thereby on the basis of a smaller piezoelectric final controlling element with a smaller adjusting path to achieve a larger amplitude of the midpoint of the mirror with respect to the curvature, since a large quantity of liquid can be displaced owing to the large construction of the pressure member, as a result of which it is possible to enlarge the curvature at the midpoint of the mirror.

Further advantageous embodiments and developments are specified in the further claims.

Preferred exemplary embodiments are represented in the drawing, in which

Figure 2:
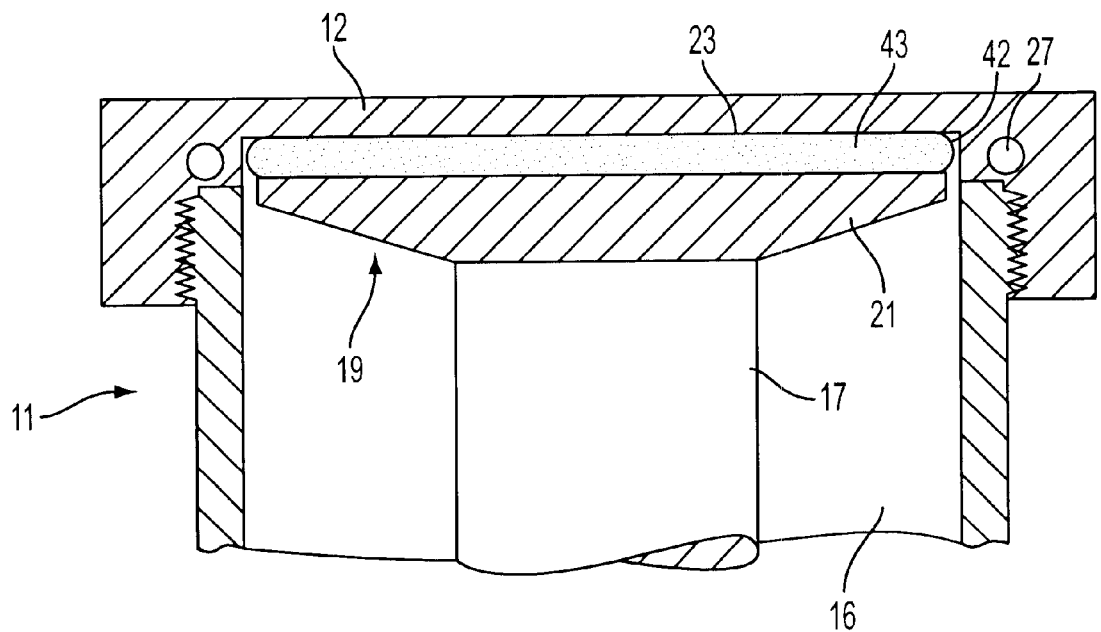
Figure 3:
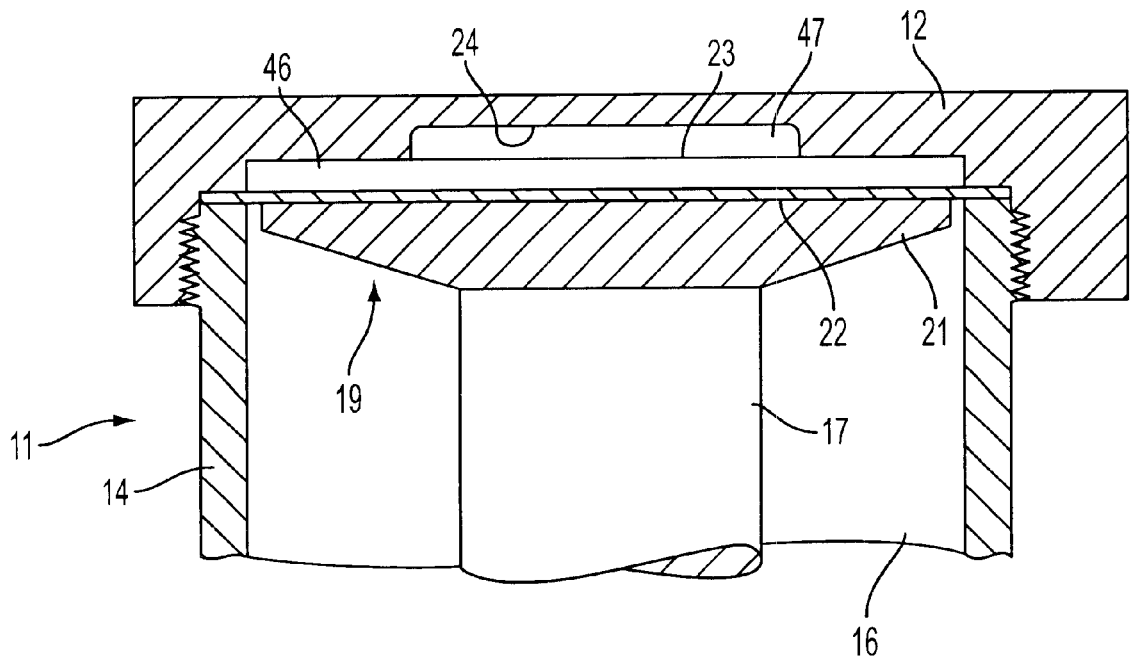
Figure 4:
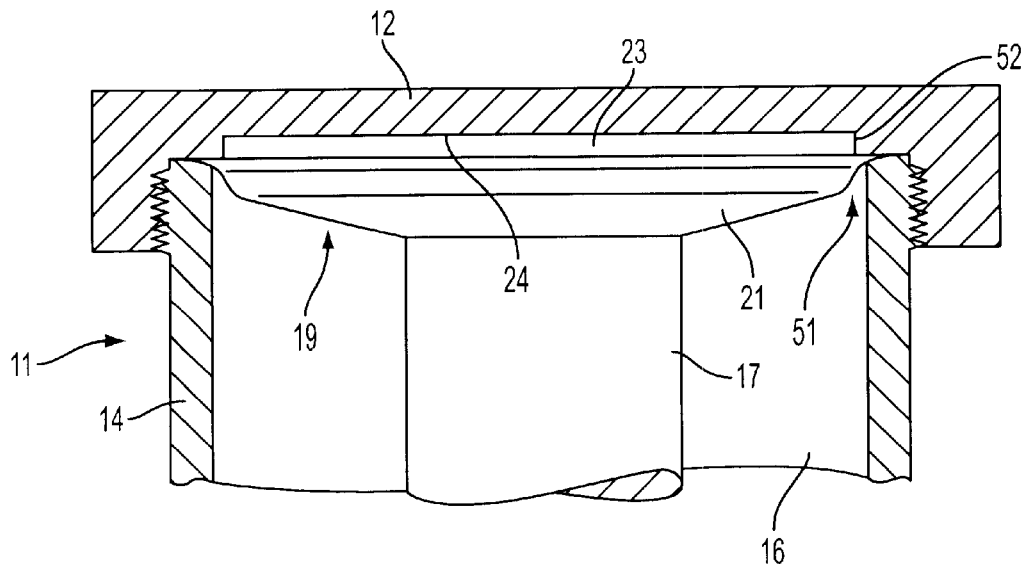
Figure 5:
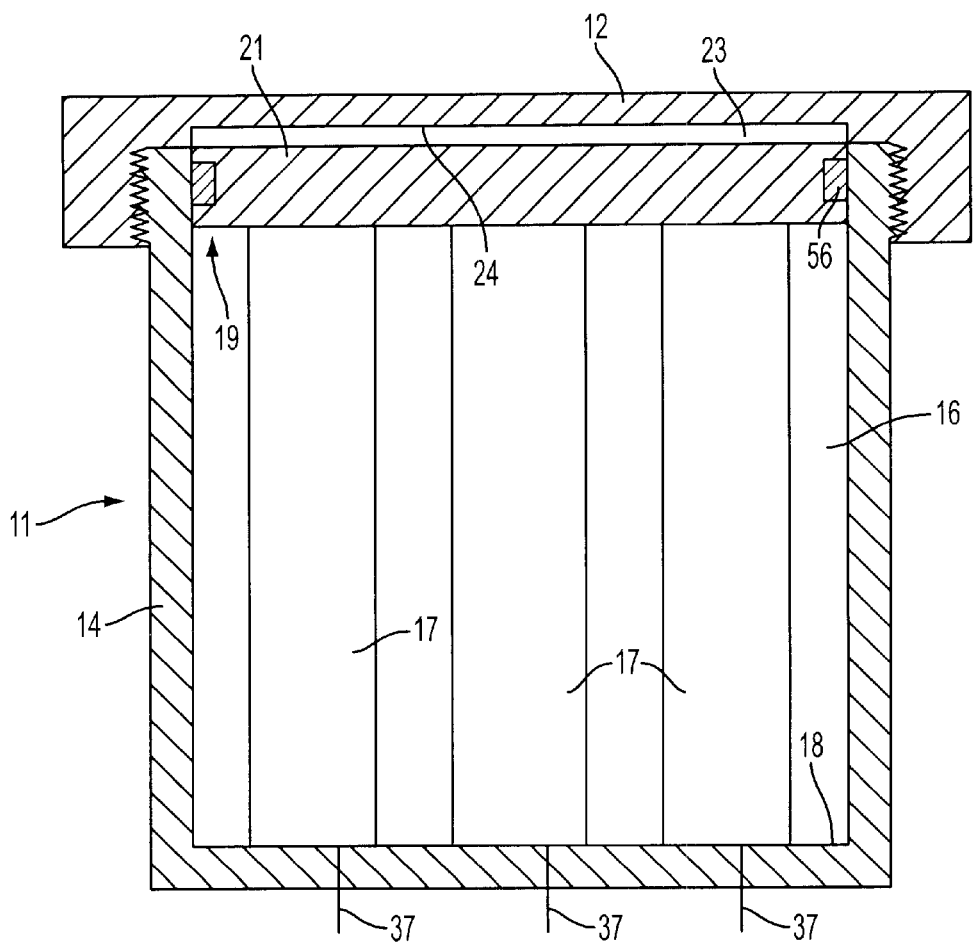

FIG. 1 shows a diagrammatic sectional representation of a device according to the invention, FIG. 2 shows a diagrammatic sectional representation of an alternative embodiment relating to FIG. 1, FIG. 3 shows a diagrammatic sectional representation of a modified embodiment in accordance with FIG. 1, FIG. 4 shows a diagrammatic sectional representation of a further alternative embodiment relating to FIGS. 1 and 2 and FIG. 5 shows a diagrammatic sectional representation of a further alternative embodiment of the invention.

A device 11 according to the invention for influencing a laser beam by means of an adaptive mirror 12 is represented in FIG. 1. The adaptive mirror or mirrors 12 are inserted in the path of a laser beam in order, for example, to adjust the focal point when machining a workpiece by means of a laser cutting head 31. This means that it is possible to use the adaptive mirror or mirrors 12 to change both the position of the focus in the z direction and also the diameter of the focus. Thus, the changes in focus caused by the different lengths of the laser beam between the laser source and laser cutting head 31 can be compensated for. These correcting measures are particularly necessary in the case, for example, of laser flatbed machines which comprise a machine area of, for example, 6×3 m.

The device 11 has a mirror housing 14 which is joined to a mirror 12 to form a closed housing unit. This can be done indirectly or directly. A final controlling element 17, which is preferably constructed as a piezoelectric actuator, is fitted on a base 18 in an interior 16 of the mirror housing 14. Provided between an end of the final controlling element 17 pointing towards the mirror 12 and the mirror 12 is a pressure-transmitting device 19 which transmits the adjusting path, which can be in the region of between 40 and 60 µm for example, to the mirror 12.

In the exemplary embodiment represented in FIG. 1, the pressure-transmitting device 19 comprises a pressure-transmitting member 21 which acts on a flexurally slack diaphragm 22 which is clamped between the mirror 12 and the mirror housing 14. This arrangement produces between the mirror 12 and the diaphragm 22 a so-called intermediate body 23 via which the adjusting path of the final controlling element 17 can be transmitted by the effect of the pressure-transmitting member 21 to the back 24 of the mirror 12, thus permitting a camber to be produced on the mirror surface. The intermediate body 23 is advantageously constructed as a closed space, the closed space preferably being provided as a relatively thin liquid film. For example, the liquid film can have a thickness of 0.2 to 0.5 mm, it also being possible for this to be larger or smaller, depending on the application.

The pressure-transmitting member 21 is constructed as a pressure plunger which has bevels facing the final controlling element 17, so that a flexurally stiff cross-section for transmitting the forces is ensured. It is preferred for the pressure plunger to be constructed as a disc, as is represented and described in more detail in FIG. 5.

It can also be provided as an alternative for the pressure-transmitting member 21 to be constructed in a mushroom shape, the final controlling element bearing against the pressure shaft. The diameter of the pressure shaft preferably corresponds to the diameter of the final controlling element 17.

A liquid, oily or gel-like substance can be placed in the intermediate body 23 thus constructed as a pressure chamber. The fluid located in the pressure chamber is preferably water. It can also be provided as an alternative to use a readily deformable largely incompressible disc made from plastic or a rubber-like material.

The diaphragm 22 is flexurally slack and can be constructed from elastomeric material or the like, with the result that the pressure-transmitting member 21, which is preferably constructed with a large diameter can bear virtually against the entire surface of the diaphragm 22.

The diaphragm 22 can also be fixed in another way. However, it is to be borne in mind with this exemplary embodiment that the pressure chamber, which bears directly against the back 24 of the mirror 12 is closed or that a closed pressure chamber is constructed. The mirror 12 is cooled by coolant guided in coolant ducts 27.

The deflection or curvature of the mirror surface or of the mirror 12 is based on the principle of a small pressure surface of the final controlling element 17 acting by means of the pressure-transmitting device 19 on a surface which has a substantially larger diameter and is found on the back of the mirror 12. Because of the displacement of the volume of the intermediate body 23, a kind of lever effect occurs which permits the adjusting path of the final controlling element 17, which is relatively small, to be enlarged. Consequently, the pressure-transmitting member 21 is constructed with a relatively large diameter and corresponds with the pressure surface thereof essentially to the inside diameter of the mirror housing 14. At the same time, the liquid film is advantageously constructed so as to be thin. When a voltage is applied to the final controlling element 17, the latter is deflected in the direction of the mirror 12, as a result of which the pressure-transmitting member 21 is moved upwards. The diaphragm sealing the pressure chamber is likewise moved in the direction of the mirror 12 with the result that the mirror midpoint 26 can be deflected. The lever effect can multiply the amplitude of the mirror midpoint 26 with respect to the adjusting path of the final controlling element 17. At the same time, however, the very high rates of adjustment can be picked up and transmitted.

The adaptive mirror is driven and interconnected in the following way:

A laser machining head 31, which is assigned to a workpiece, has a measuring device 32 for the lengths of the axes x, y of the laser machining head 31, and a measuring device 33 in the z direction. The measuring devices 32 and 33 transmit the currently detected data to a controller 34. The data required for changing the focal position or the focal diameter are determined therefrom. The controller 34 outputs a corresponding signal to a voltage source 36 which is connected via an electric line 37 to the piezoelectric final controlling element 17. Further adaptive mirrors 12 can be connected to the controller 34. A permanent drive can be provided for the adaptive mirror 12 by continually detecting the measured values by means of the measured-value device [sic] 32, 33. A bandwidth with a frequency of up to 2 kHz can be possible, for example.

An alternative embodiment to FIG. 1 is represented in FIG. 2. By contrast with FIG. 2, the intermediate body 23 is not filled with a liquid or the like and sealed by a diaphragm 22 but has a pressure cushion which is clamped between the back 24 of the mirror 12 and the pressure-transmitting member 21 of the pressure-transmitting device 19. The pressure cushion has a preferably elastic skin 42 which is closed on all sides and holds in the interior a liquid or gel-like substance 43. Such an embodiment has the advantage of simplifying the assembly. Moreover, by selecting the substance and the volume in the interior of the pressure cushion, it is possible to achieve adaptation to the rate of transmission or frequency and the magnitude of the amplitude.

An advantageous development of an inventive device 11 in accordance with FIG. 1 is represented in FIG. 3. On the back 24 of the mirror 12, the intermediate body 23 has a stepped configuration, a first section 46 being provided with a large diameter and a second section 47 with a smaller diameter. This stepped arrangement of the back 24 of the mirror 12 helps to achieve an increase in the lever ratios. A higher curvature of the mirror 12 is permitted by virtue of the tapering of the wall thickness at the mirror midpoint 26. At the same time, the section 47 can hold an additionally spaced quantity of liquid of the edge regions in the section 46, as a result of which the amplitude can be increased in order to deflect the mirror 12 or to increase the curvature of the mirror 12.

It can be provided as an alternative that the back 24 of the mirror 12 has multiple stepping, the diameters of the sections 46, 47 decreasing towards the mirror midpoint 26. It is also possible to provide conical tapering or a combination thereof.

A further alternative embodiment of the device 11 relating to FIGS. 1 and 2 is represented in FIG. 4. By contrast with the embodiment in accordance with FIG. 1, the pressure-transmitting device 19 comprises a pressure-transmitting member 21 which has in its outer edge region an elastic spring element 51 which seals the interspace 23 or the pressure chamber. The spring element 51 can be clamped between the mirror 12 and the mirror housing 14. It can also be provided as an alternative that the spring element 51 bears against an annular collar 52 of the mirror 12 and forms a closed space of the intermediate body 23. The spring element 51 is advantageously constructed as a disc spring which runs to a point at its free end in the edge region. The sealing element or spring element 51 can be constructed in one piece with the pressure-transmitting member 21 or as an inserted piece.

The back 24 of the mirror 12 can also as an alternative be constructed in a fashion similar to the back 24 represented in FIG. 3.

A further alternative embodiment of the device 11 is represented in FIG. 5. In the case of this embodiment, it is provided that, for example, three final controlling elements 17, which are preferably driven in common via electric lines 37, act on the pressure-transmitting member 21. The final controlling elements 17 are advantageously arranged spaced uniformly from one another over the circumference on a specific diameter. Alternatively, it can also be provided that only one, two or more final controlling elements 17 are provided. These final controlling elements 17 act simultaneously on a pressure-transmitting element 21 which is constructed as a flexurally stiff disc and can be moved in the mirror housing 14 at rightangles to the mirror midpoint 26 along the adjusting path. The pressure-transmitting member 21 seals the pressure chamber tightly with respect to the medium. Provided for this purpose between the circumferencial edge of the pressure-transmitting member 21 and the mirror housing 14 is a sealing element 56 which is preferably constructed as an O ring. This configuration of the embodiment of a closed pressure chamber is an alternative configuration to the arrangement employing a diaphragm 22 in accordance with FIGS. 1 and 3 or a sealing spring element in accordance with FIG. 4.

It can also be provided that in the case of the embodiment in accordance with FIG. 5 a diaphragm 22, spring element 51 or a pressure cushion is provided instead of the sealing element 56. The exchangeability of the individual features of the embodiments also holds for further structural components.

All the embodiments have in common that the pressure is transmitted from a relatively small surface of the final controlling element 17 to a large surface of the pressure-transmitting member 21, and this in turn permits a surface with has a large effect on the back 24 of the mirror 12. At the same time, a large displacement volume can be achieved by the pressure chamber, which is of relatively narrow or thin construction, or of the liquid film, with the result that the amplitude of the mirror midpoint 26 and thus the curvature of the surface of the mirror 12 can be of relatively large construction. At the same time, this configuration of the devices according to the invention results both in good optical quality and in a high bandwidth of the frequencies for the adaptation of the mirror 12.

Moreover, according to the invention it is possible to provide an alternative device which has a pressure chamber which faces the back of the mirror and, seen in the longitudinal axis leading through the mirror midpoint, has, for example, a pressure column which is connected to the pressure chamber and to which an intermediate piston can be applied. A piezoelectric final controlling element which moves the intermediate piston in the direction of the mirror midpoint by means of an adjusting movement can act at the opposite end of the intermediate piston, as a result of which the volume of the liquid, the substance located in the pressure chamber is increased, so that the mirror surface or the mirror can bend.

Also conceivable are further alternative embodiments which comprise a combination of the pressure-transmitting device with a piezoelectric final controlling element.

What is claimed is:

1. Device for influencing a laser beam by an adaptive mirror with a deformable surface in a beam path, comprising a piezoelectric adjusting member arranged on a back of the mirror, a pressure-transmitting device between the adjusting member and the back of the mirror to achieve low-aberration deformation of the mirror for the purpose of influencing divergence of the beam, wherein the pressure-transmitting device acts on the deformable surface of the mirror, and wherein the pressure-transmitting device comprises a largely incompressible, easily deformable intermediate body.

2. Device according to claim 1, wherein the pressure-transmitting device has a pressure-transmitting member which acts on the intermediate body.

3. Device according to claim 2, characterized in that the pressure-transmitting member is constructed with a large diameter and has a pressure shaft which is constructed with a small diameter and encloses the piezoelectric adjusting member at least partially.

4. Device according to claim 2, characterized in that the pressure-transmitting member is of disc-shaped construction and bounds a pressure chamber located at the back of the mirror.

5. Device according to claim 4, characterized in that a sealing element is provided between a circumferential surface of the pressure-transmitting member and a mirror housing surrounding the pressure-transmitting member.

6. Device according to claim 5, wherein the sealing element comprises an O-ring.

7. Device according to claim 1, characterized in that on the back of the mirror the intermediate body comprises a pressure chamber that has pressure chamber sections which extend radially outwards from a center of the pressure chamber and become larger in diameter.

8. Device according to claim 7, wherein the pressure chamber sections become larger in steps.

9. Device according to claim 1, characterized in that the intermediate body is constructed as a pressure cushion which is formed from an elastic skin which is closed on all sides and whose interior is filled by a liquid, oily or gel-like substance.

10. Device according to claim 1, characterized in that the intermediate body is constructed as a thin, easily deformable, largely incompressible disc.

11. Device according to claim 10, wherein the disc comprises plastic or a rubber-like material.

12. Device according to claim 10, wherein the intermediate body comprises plastic or rubber-like material.

13. Device according to claim 1, wherein the intermediate body has thickness in the region of tenths of a millimeter.

14. Device for influencing a laser beam by an adaptive mirror with a deformable surface in a beam path, comprising a piezoelectric adjusting member arranged on a back of the mirror, a pressure-transmitting device between the adjusting member and the back of the mirror to achieve low-aberration deformation of the mirror for the purpose of influencing divergence of the beam, wherein the pressure-transmitting device acts on the deformable surface of the mirror, and wherein the pressure-transmitting device comprises an intermediate body, and wherein the intermediate body is a liquid, oily or gel-like substance located in a closed space.

15. Device according to claim 14, characterized in that the liquid located in the closed space is water.

16. Device according to claim 14, characterized in that the closed space is a pressure chamber which is adjacent to the back of the mirror and is bounded by a diaphragm.

17. Device according to claim 16, characterized in that the surface of the pressure-transmitting device is at least equal to or larger than the back surface of the mirror.

18. Device according to claim 16, wherein said diaphragm is flexurally slack.

19. Device according to claim 14, wherein said pressure-transmitting device comprises a pressure plunger constructed as a flexurally stiff disc which bears against a diaphragm essentially with its entire surface.

20. Device according to claim 16 characterized in that the closed space is a pressure chamber which is adjacent to the back of the mirror and is bounded by a resilient element.

21. Device according to claim 20, characterized in that the resilient element comprises a disc spring arranged on the pressure-transmitting device and bearing against the edge of the pressure chamber.

22. Device according to claim 14, characterized in that the pressure-transmitting device is affected by at least one piezoelectric adjusting member.

23. Device according to claim 22, characterized in that the at least one piezoelectric member comprises a plurality of piezoelectric adjustment members wherein a uniform distribution is provided over the surface of the pressure-transmitting device to be affected.

24. Device according to claim 14, characterized in that the piezoelectric adjusting member is connected to at least one voltage-generating device which can be controlled by a programmable controller.

25. Device according to claim 24, characterized in that the programmable controller uses a measuring device that detects the position of a laser cutting head with respect to a workpiece to be cut in an X-Y plane, and uses a further measuring device to detect the position in the Z direction, and drives the adaptive mirror as a function of the detected position of the laser cutting head.

* * * * *